United States Patent [19]

McNair

[11] Patent Number: 5,375,244
[45] Date of Patent: Dec. 20, 1994

[54] SYSTEM AND METHOD FOR GRANTING ACCESS TO A RESOURCE

[75] Inventor: Bruce E. McNair, Holmdel, N.J.

[73] Assignee: AT&T Corp., Murray Hill, N.J.

[21] Appl. No.: 891,347

[22] Filed: May 29, 1992

[51] Int. Cl.$^5$ .............................................. H04L 9/00
[52] U.S. Cl. .............................. 395/725; 340/825.34; 380/3; 395/575
[58] Field of Search .............. 395/725, 700, 575, 2.82; 340/825.34, 825.31, 825.5, 825.54, 825.3; 380/25, 23, 3, 4

[56] References Cited

U.S. PATENT DOCUMENTS

| | | | |
|---|---|---|---|
| 4,719,566 | 1/1988 | Kelley | 340/825.34 |
| 4,748,668 | 5/1988 | Shamir et al. | 380/30 |
| 4,962,449 | 10/1990 | Schlesinger | 395/325 |
| 5,148,481 | 9/1992 | Abraham et al. | 380/46 |
| 5,153,918 | 10/1992 | Tuai | 380/25 |

OTHER PUBLICATIONS

S. O'Henry, "Banks Finally Solve AI", Computers in Banking, vol. 7, No. 8, pp. 30–37, Aug. 1990.

P. deBruyne et al. "Password–Plus, Authentication Using Dynamic Features", Scientia Electrica, vol. 36, No. 2, pp. 1–19, 1990.

D. C. Rine, "Some Applications of Fuzzy Logic to Future and Expert Systems", IEEE 1985 Proceedings of the International Conference on Cybernetics and Society, pp. 351–356.

B. Hussien, et al. "An Application of Fuzzy Algorithms in a Computer Access Security System", Pattern Recognition Letters, vol. 9, No. 1, pp. 39–43, Jan. 1989.

*Primary Examiner*—Allen R. MacDonald
*Assistant Examiner*—Glenn A. Auve
*Attorney, Agent, or Firm*—Barry H. Freedman

[57] ABSTRACT

An access control system is implemented with a maximum-likelihood "soft" decision process that determines whether a user's actions are most like those of a valid user or most like those of a hacker. Data obtained from transactions involving both valid users and hackers is clustered in a multidimensional attribute space, with each of the clusters representing an attribute profile of similar user behaviors. The similarity between the attributes of an access attempt and the attribute profiles represented by the clusters is evaluated, to identify profiles of valid and fraudulent users that most closely resemble the attributes of the access attempt. An access decision can then be made simply based upon which type of user (valid or fraudulent) the access attempt most closely resembles. Alternatively, the access decision can be made by comparing probabilities of eligibility for access, based upon the relative closeness of the resemblances between the profiles for valid and fraudulent users and the profile of the user attempting to gain access, and a function which relates the probability of eligibility to other factors, such as the confidence of the decision, the value of the resource, and so on. In this way, a particular access request is characterized as most likely valid or most likely fraudulent. The history of previous access attempts by particular users may be stored and used subsequently in the access decision process.

18 Claims, 7 Drawing Sheets

SYSTEM AND METHOD FOR GRANTING ACCESS TO A RESOURCE

FIELD OF THE INVENTION

This invention relates generally to a system for controlling access to a resource, such as a telecommunications network or a computer, so that access by unauthorized persons is disallowed.

BACKGROUND OF THE INVENTION

There are currently many situations in which unauthorized persons fraudulently gain access to a resource, causing a large financial loss to the resource provider. For example, international calling card fraud creates a significant level of uncollectable revenue, putting a telecommunications company into an uncomfortable position of either allowing call completions where there is a chance that a specific calling card number has been compromised or, disallowing call completions where the valid user is attempting the call. In the first case, the telecommunications company stands to lose the call revenue, compounded by the fact that when a bill is rendered, it will contain a charge that will likely annoy the valid user. In the second case, a call refusal might be the safe thing to do, but it would aggravate a loyal customer and still incur costs of handling a portion of the call.

The typical method used to control access to a resource depends on two types of facilities—"user permissions" and "access control lists." Generally, user permissions are sets of capabilities or destinations to which a user may connect. These are sometimes called "subject oriented controls". Access control lists are "object oriented controls", defining who may access an object and under what conditions. Based upon this traditional subject/object model of security controls, a "strict" or "hard" decision is made as to whether access should be granted or denied. Unfortunately, a strict decision process works best for simple cases, where the number of classes of subjects and/or objects is relatively small. In the case of many access control applications such as long distance calling, the number of callers, destinations, etc. is likely to be enormous, complicating the problem to the point that effective access control would be burdensome to manage and difficult or impossible to implement.

SUMMARY OF THE INVENTION

In accordance with this invention, an access control system is implemented with flexible controls that permit a "soft" access control decision to be made as to whether a user is eligible to gain access to a resource. Data obtained from transactions involving both valid and fraudulent users is clustered in a multidimensional attribute space, with each of the clusters representing an attribute profile of similar user behaviors. Next, the similarity between the attributes of an access attempt and the attribute profiles represented by the clusters is evaluated, to identify the profiles of valid and fraudulent users that most closely resemble the attributes of the access attempt. If desired, an access decision can then be made simply based upon which type of user (valid or fraudulent) the access attempt most closely resembles. However, in accordance with a preferred embodiment of this invention, the access decision is made by computing and then comparing probabilities of eligibility for access, based upon the relative closeness of the resemblances between the profiles for valid and fraudulent users and the profile of the user attempting to gain access, and a function which relates the probability of eligibility to other factors such as the confidence of the decision, the value of the resource, and so on. Thus, the invention can be viewed as characterizing a particular access request as most likely valid or most likely fraudulent. If desired, the history of previous access attempts by particular users may be stored and used subsequently in the access decision process.

The invention described above can be represented mathematically as follows: Data obtained from transactions involving both valid and fraudulent users is stored in the form of multiple records, each containing a plurality of numerical attribute values. The stored data is analyzed for the purposes of defining clusters in a multidimensional attribute space, using an iterative minimum distance modelling technique. Each cluster is represented by its coordinates in the multidimensional space. The similarity between the attributes of an access attempt and the attribute profiles represented by the clusters is evaluated by identifying the clusters having the smallest distance to a point in the multidimensional space that represents the attributes of that access attempt. While the access decision can then be made based upon the relative distances between the closest clusters and the point representing the access attempt, it is advantageous to compute the probability of eligibility for access as a function of the relative distances to the nearest valid and fraudulent clusters, the dispersion of the clusters, the average spacing between valid clusters, and the average distance between valid and fraudulent clusters, etc.

In the context of a long distance telephone call, the cluster data may relate to the type of station at which a call is originated, geographic dispersion of originator, geographic dispersion of destination, type of station called, calls/unit time, number of simultaneous sessions, time of day, and level/means of authentication. Inputs are obtained from both valid users and from "hackers", since hackers engage in certain sets of specific behaviors that are generally distinct from valid users' behaviors, and this data can thus also be clustered.

The present invention provides an efficient way to approach the access control problem by solving many of the problems inherent in more traditional approaches. This can, in the context of long distance calling, be thought of as restating the objective of access control: the decision to be made is not "Can user W calling from station X access destination Y under condition Z," but, rather, "For a given call attempt, supposedly originated by user W, is this user behaving more like a valid user in the character we have observed them before, or are they acting more like a hacker acting like hackers generally act?" By asking the question in this way, it is possible to create a soft decision, using fuzzy logic, that builds upon notions already used in data transmission and speech processing applications—namely, that valid results can be obtained from maximum likelihood data estimation techniques.

This approach to making access control decisions has wide applicability to resources whose cost of loss versus level of compromise vary gradually—namely, expendable resources including international long distance revenues. It eliminates many of the database complications associated with user permissions lists and access control lists. Further, where there is soft input data, e.g., "how much does this user sound like the real user," the soft decisions can be used directly to adjust the final accept/deny decision, providing easily calculated levels of access that are justified in terms of the confidence in the subject.

BRIEF DESCRIPTION OF THE DRAWINGS

The invention will be better appreciated by consideration of the following detailed description, when read in light of the accompanying drawing in which.

DETAILED DESCRIPTION

Figure 1:
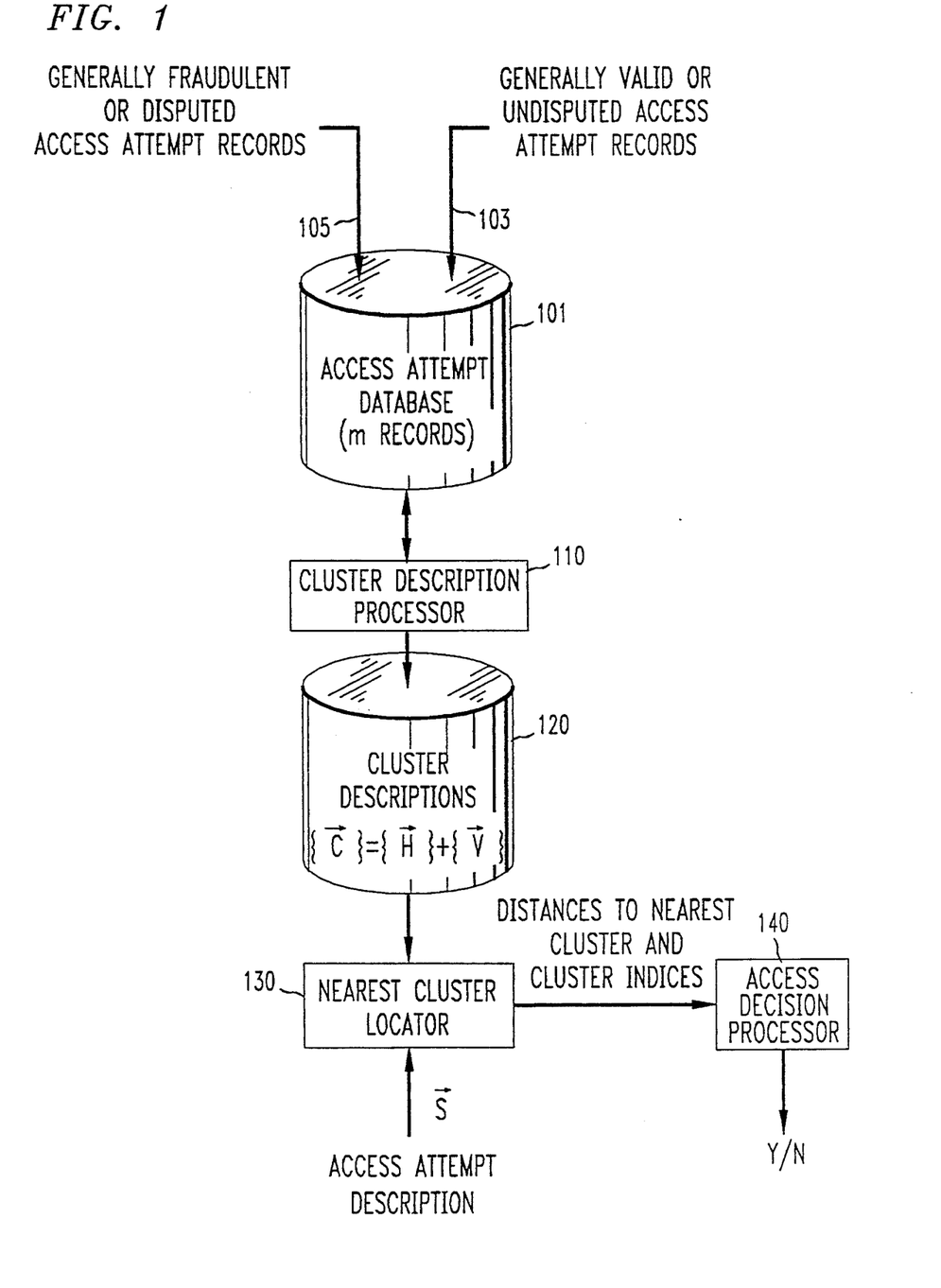
FIG. 1 is a block diagram of an access control system arranged in accordance with the principles of the present invention.

Referring first to FIG. 1, there is shown a block diagram of an access control system arranged in accordance with the principles of the present invention. An access attempt database 101, which may be a stand-alone database or associated with a processor, is arranged to receive as input and to store, two types of records. First, records input via a first path 103 represent attributes associated with generally valid access attempts, i.e., those attempts which were not disputed by the person making the attempt or the network provider. Second, records input via a second path 105 represent attributes associated with generally fraudulent access attempts, i.e., attempts which were disputed by the customer receiving a bill. For the purposes of this specification, fraudulent or disputed attempts will be referred to as being made by a "hacker", although it is to be understood that this term is meant to be inclusive of other individuals that seek access without authorization. In addition to a bill being disputed, a fraudulent attempt could also be indicated in the case of telecommunications network access by, for example, subsequent admission by a hacker or through call tracing.

Figure 2:
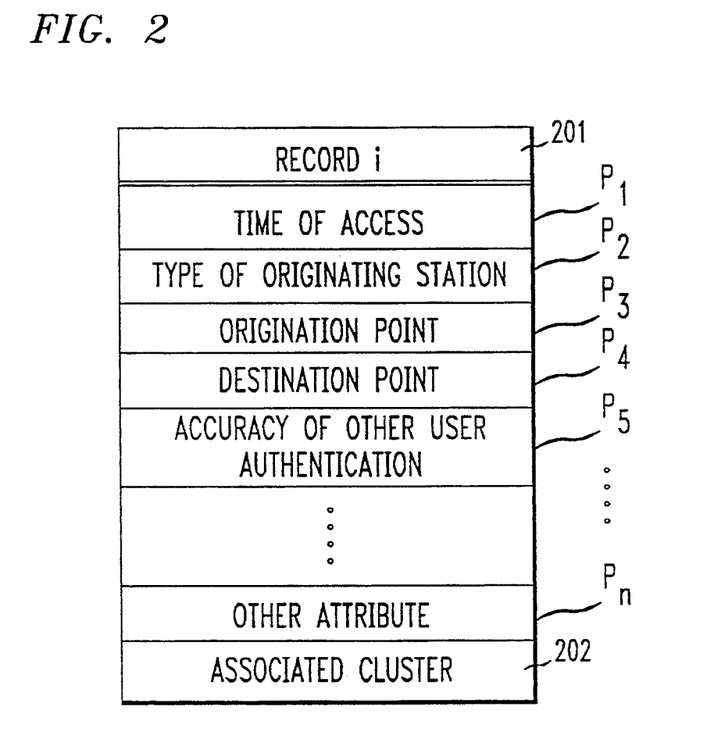
FIG. 2 illustrates the format of a typical record stored in access attempt database 101 of FIG. 1.

Before describing the processing of the "m" ("m" is an integer) records stored in access attempt database 101, it will be instructive to describe the layout of typical records stored therein, as illustrated in FIG. 2. As shown, each of the m records includes a key data field 201, which uniquely distinguishes each record from all others and which makes cross referencing easier. Attribute data in each record are designated $p_1$ through $p_n$, indicating "n" different attributes or factors that may be considered significant in distinguishing the behavior of a valid user from that of a hacker. In the context of long distance calling, these attributes, shown in FIG. 2, may include time of access attempt ($p_1$), type of originating station ($p_2$), originating location ($p_3$), terminating location ($p_4$), accuracy of other forms of user authentications ($p_5$), and so on. Obviously, in other applications, different attributes will be relevant. Further, it may be appreciated that for some records, values for each of the attributes may not be known precisely. Thus, since a system in accordance with the present invention does not depend upon precise knowledge or hard decisions, average values can be placed in the attribute fields that are not known. Each record also includes a field 202 in which the identity (index value) of the associated cluster is stored. This is discussed in more detail below.

Figure 3:
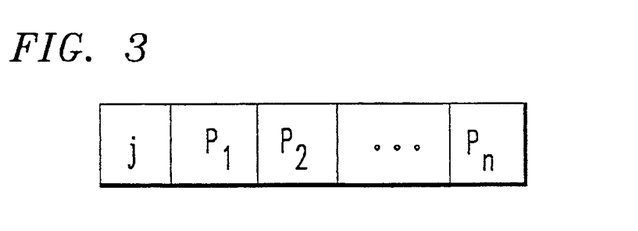
FIG. 3 illustrates the format of a typical cluster description stored in database 120 of FIG. 1.

The "m" records stored in access attempt database 101 are processed in a cluster description processor 110, in order to form a set of k cluster descriptions $c_1$ through $c_k$ that represent the expected behavior, with respect to each of the n attributes, of both valid users on the one hand, and of hackers on the other hand. A cluster description can be thought of as equivalent to the location of a point in an n dimensional attribute space; the coordinates of the point represent the values of the n attributes contained in the record. Cluster descriptions for valid users are designated $v_j$ (j=1 to l) while cluster descriptions for unauthorized or fraudulent users are designated $h_j$ (j=l+1 to k). Under some circumstances, such as when there is no a priori knowledge of the particular values of a parameter "p" that corresponds to valid or hacker behavior, it may prove advantageous to have the initial values for the cluster descriptions chosen randomly and dispersed uniformly throughout the "n dimensional" attribute space. This is done so that any significant details relating to the two types of behavior are capable of being captured in the definition process. Thereafter, the random values are replaced by calculated values based upon the analysis of the observed data, as further explained below. The cluster descriptions formed in cluster description processor 110 are stored in a cluster descriptions database 120 in the form of records having a format shown in FIG. 3. As will be seen therein, each of the k records includes an index value, 'j', followed by the values of the n attributes $p_1$ to $p_n$. This plurality of records is sufficient to properly model typical behaviors of a valid user or a hacker. The clusters of valid user behavior may be thought of as sets of typical user demographics and each cluster might correspond to a particular way a set of users accesses the resource or system protected using this invention. For example, the usage behavior of a "traveling salesman" would be similar to others of this class of users, but distinctly different than an "over the road truck driver". Correspondingly, these two would differ significantly from "residential users with children away at college".

An example will illustrate the foregoing. Assume that the important attributes for access to a telephone network are call origination source type, call origination time, and per-minute call cost. The records applied on input path 103 for valid users are processed in cluster description processor 110 to indicate that for a first type of valid user, call origination is from a public phone by credit card, such calls originate during business hours, and the average cost of the call is $0.75 per minute. This cluster represents a typical daytime call from a business traveller. Another valid user has a call originating from a residence location, a call origination time of early evening, and an average cost of $0.10 per minute, indicative of typical teenage evening calls. Yet other clusters may be indicative of weekend calling patterns to relatives, international business calls, international calls to relatives, etc.

In similar fashion, the records applied on input path 105 for hackers are processed in cluster description processor 110 to indicate that for a first type of hacker, call origination is from a pay telephone using a collect call, such calls originate during business hours, and the average cost of the call is $3.55 per minute. This cluster represents a typical daytime call involving an international drug transaction. Another hacker has a call origination from a residence, a call origination time of late evening or very early morning, and an average cost of $1.10 per minute, indicative of typical hacker calls to try to gain access to a computer facility.

In the preceding example, another factor that may be considered in the clustering process is the accuracy of other forms of user authentication. Thus, the calling party may be required to enter a personal identification number (PIN) which is validated before access is granted. Current systems require that the user enter a PIN that exactly matches the correct value stored in a database. Any error or deviation causes the access attempt to fail. Using the present invention, entry of a close but not exact PIN (evaluated in conjunction with the other attributes mentioned above) may still lead to eligibility to access the network, by using the accuracy measure as yet another attribute in the decision process. With this approach, a valid user who knows the correct PIN but forgets or mis-enters a digit will advantageously have a higher likelihood of gaining access, (and will not be automatically blocked) since the accuracy of the valid user can be relied upon as an attribute that is generally higher than the accuracy of a hacker who is guessing at the entire PIN. In a similar fashion, a voice password system may be used instead of a PIN based system, such that the current voice sample is compared against a stored voice template, and the resemblance (sometimes referred to as the distance) between the two is used as an attribute in the clustering process.

Figure 4:
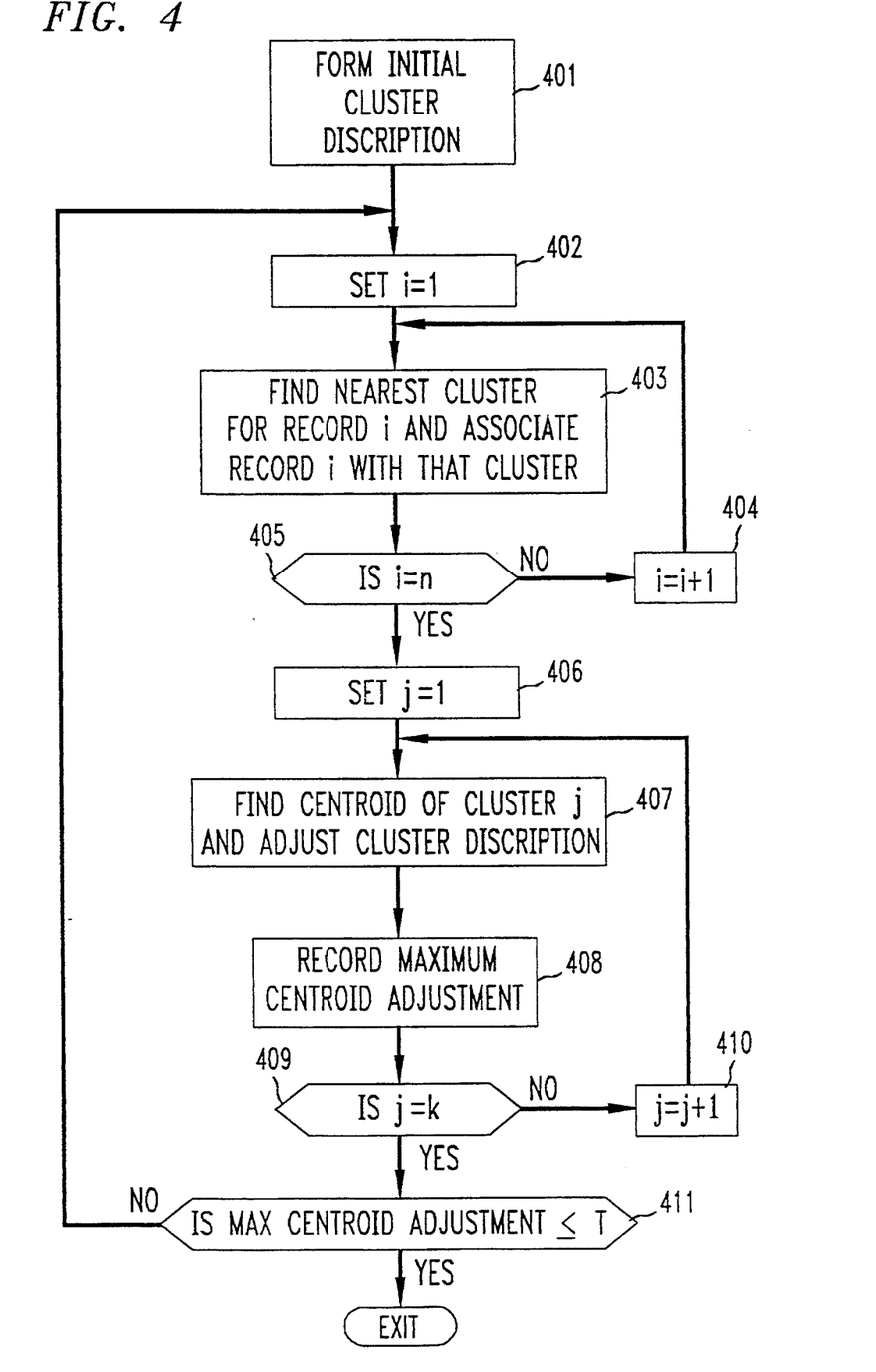
FIG. 4 illustrates the cluster description process performed in cluster description processor 110 of FIG. 1.

The process performed in cluster description processor 110 is illustrated in the form of a flow chart in FIG. 4. In step 401, an initial set of cluster descriptions is formed. As stated previously, initial values for the cluster descriptions may be chosen randomly and dispersed uniformly throughout the n dimensional attribute space. Alternatively, this step can be eliminated, and the process started in step 402.

In step 402, the value of index "i" is set at 1. Then, in step 403, record i is retrieved from access attempt database 101 and its attributes examined in order to find the "closest" cluster. In this context, the distance of a record from a cluster is determined by computing the vector distance, in n dimensional space, between a first point representing the cluster and a second point representing the record being processed. The distance computation is repeated for each cluster, and the index number of the cluster with the smallest distance from the record is associated with that record by, for example, entering the index number in field 202 of FIG. 2. (If step 401 is not performed initially, then each record is considered to define a cluster, during the first iteration of the process of FIG. 4).

The process just described is repeated for each of the m records in access attempt database 101 that represent undisputed access attempts by valid users. Thus, if the value of index i has not reached the value $m_v$ in step 405, representing the number of such records, the index is incremented in step 404, and step 403 is repeated. When all $m_v$ records have been processed, the next phase of the cluster description process begins. As pointed out below, the entire cluster description process performed with respect to attributes in records for valid users is repeated, with respect to attributes in the records for hackers. The cluster description processes are performed independently of each other, so that the clusters for valid users are not impacted by attributes associated with hackers, and vice-versa.

In step 406, an index j representing the identity of each cluster is initialized at the value 1. Then, in step 407, the "centroid" of the $j^{th}$ cluster is located, and the description of the cluster stored in cluster descriptions database 120 is updated accordingly. As used herein, the centroid of a cluster is the point, in n dimensional space, which has the minimum total distance from all of the points that correspond to records associated with that cluster. Information describing the calculation of centroids is contained in an article entitled "A Vector Quantization Approach to Speaker Recognition" by F. K. Soong et al., which appeared in the AT&T Technical Journal, March/April 1987, volume 66, issue 2, pp 14–26. This step is performed so that the attributes of a valid user, in the case of clusters 1 to l, and the attributes of a hacker, in the case of clusters l+1 to k, are refined iteratively. As stated previously, these attributes are a distillation of the information contained in the records in access attempt database 101.

In step 408, the amount of the maximum adjustment for any of the k clusters processed in step 407 is stored. This is done by comparing the adjustment just made in step 407 with the adjustment value previously stored: if the most recent adjustment is larger, its value replaces the stored value, otherwise, no replacement is necessary. If all of the k clusters have not been processed, as determined in step 409, the value of j is incremented in step 410, and step 407 is repeated for another cluster. When all of the clusters have been processed, a determination is made in step 411 as to whether the centroids for all clusters have converged on final values that truly represent the data in the records within access attempt database 101. This can be determined by comparing the maximum adjustment stored in step 408 with a predetermined threshold value T. If the adjustment is smaller than T, the process of FIG. 4 is terminated. Otherwise, the cluster description process is continued by returning to step 402. Note that all of the records in access attempt database 101 are again examined and processed, using the newly computed cluster descriptions in place of the initial cluster descriptions formed in step 401, or in place of the previous cluster descriptions formed by a previous iteration of the process of FIG. 4.

Once the process of FIG. 4 has been completed with respect to the $m_v$ records for valid users, the entire process is repeated for the $m_h$ records for hackers. In this way, all of the m records stored in access attempt database 101 are processed. Note also that it is desirable, from time to time to update the information in cluster descriptions processor 120 for both valid users and for hackers. For this purpose, the process of FIG. 4 is preferably re-initiated on a periodic basis, for example when a certain number of new records have been added to access attempt database 101.

One of the attributes of the process of FIG. 4 is that if the initial number of clusters is larger than the number of clusters actually needed, the cluster descriptions generated in cluster description processor 110 will cause redundant clusters to collapse into a smaller set of clusters. This occurs because the definition process is iterative, operating on a "trial and error" basis by picking an initial set of clusters, positioning the centroid, then recomputing the clusters, repositioning the centroid, and so on, until the change between successive centroids is so small as to be negligible. In this iterative process, unnecessary clusters are eliminated when all of the data points previously associated with some clusters become associated with other clusters.

Because the process of FIG. 4 is iterative, it may be subject undesirable "oscillations" that would prevent the centroids of the individual clusters from converging. To achieve stability, it is desirable, in certain circumstances, to restrain the maximum adjustment permitted in step 407 to a predetermined maximum value, or to make an adjustment that is a fraction of the calculated adjustment. This restraint essentially dampens the iterative process, assuring convergence.

Figure 5:
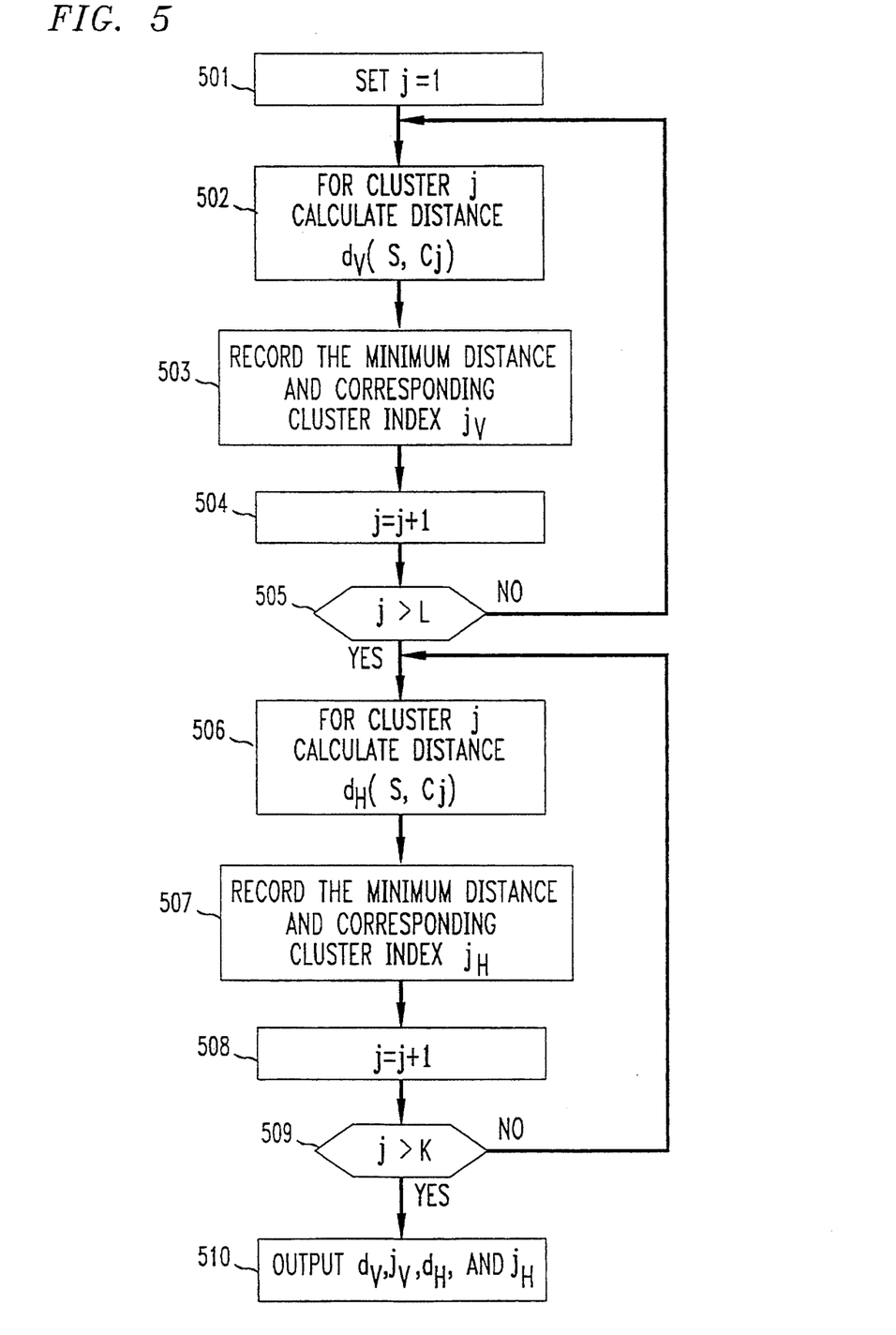
FIG. 5 illustrates the decision analysis process performed in nearest cluster locator 130.

Referring again to FIG. 1, when an access request is received by the system from a user, the attributes associated with that attempt are applied to a nearest cluster locator 130, which is arranged to compare the attributes of the access request (sometimes hereafter referred to as a "sample point S") with those contained in the cluster descriptions stored in database 120. The process followed in nearest cluster locator 130 in analyzing the received samples, which is illustrated in FIG. 5, has two primary functions: identification of a first specific cluster representing a valid user that has attributes most nearly like those of the received access request, and identification of a second cluster representing a hacker that has attributes most nearly like those of the received access request. Geometrically, these processes can be thought of as locating the clusters that are nearest to the sample point S in n dimensional space.

First, in step 501, the value of index j is set to 1. Then, the first record in database 120, containing data describing the attributes of a valid user as represented by the location, in n dimension space, of the first cluster $c_v$, is retrieved, and compared, in step 502, with the values of the attributes of the access request (sample S), to compute what can be referred to as a "distance" indicative of the closeness of the sample to the cluster. This distance, denoted $d_v$, can be the "mean squared distance" calculated using the relationship:

$$d(S, C_j) = \frac{\sum_{q=1}^{n} (s_q - c_{jq})^2}{n}$$

In the foregoing equation, $s_q$ refers to each of the n individual attributes associated with the access attempt, with q being simply an index variable. Similarly, $C_{jq}$ refers to each of the n corresponding attributes associated with the cluster description $C_j$. The effect of the equation is to calculate a number which may be thought of as the "hypotenuse" of an "n dimensional triangle", and which serves as an appropriate distance measure for the present invention.

The distance calculated in step 502 is compared in step 503 with the minimum distance held in a memory, and the newly calculated distance is recorded (stored) in the memory, together with the corresponding cluster index j, only if it is less than the distance held in memory. In this way, a running minimum value is maintained in step 503. In step 504, the value of index j is incremented, and, in step 505, a determination is made as to whether additional clusters of the L clusters representing valid attributes remain to be evaluated. If so, steps 502 through 505 are repeated for these clusters in turn, thereby computing a series of distances and storing the minimum distance and the cluster index.

When all L clusters for valid users have been evaluated, the same process described above is repeated for the remaining k–L clusters which pertain to hackers. Thus, in step 506, the first record in database 120, containing data describing the attributes of a hacker as represented by the location, in n dimension space, of the first cluster $c_h$, is retrieved, and compared with the values of the attributes of the present access request (sample), to compute a distance indicative of the closeness of the sample to the cluster. This distance, denoted $d_h$. Again, the minimum distance is recorded (stored) in step 507 and the index j incremented in step 508. If all of the clusters for hackers have not been evaluated, then step 509 returns a negative result when evaluating if j>K, and steps 506 through 508 are repeated. If all of the clusters for hackers have been evaluated, the values $d_v$ and $j_v$, representing the distance from the closest cluster for a valid user and its index, and the values $d_h$ and $j_h$, representing the distance from the closest cluster for a hacker and its index are output in step 510 and applied to access decision processor 140 of FIG. 1.

The decision made in access decision processor 140 of FIG. 1 can be based simply on a comparison of the values of $d_v$ and $d_h$, thereby determining if the sample being evaluated has attributes that are closest to those of a valid user or a hacker. This decision, based upon the distance measures of the sample to valid and hacker clusters, is considered a "soft decision", since the attributes of the sample are not compared to fixed thresholds, but rather evaluated to determine if they are most like one or the other of the valid user and hacker attributes. However, it has been found advantageous to also consider probabilities in making the access decision, as described further below.

Figure 6:
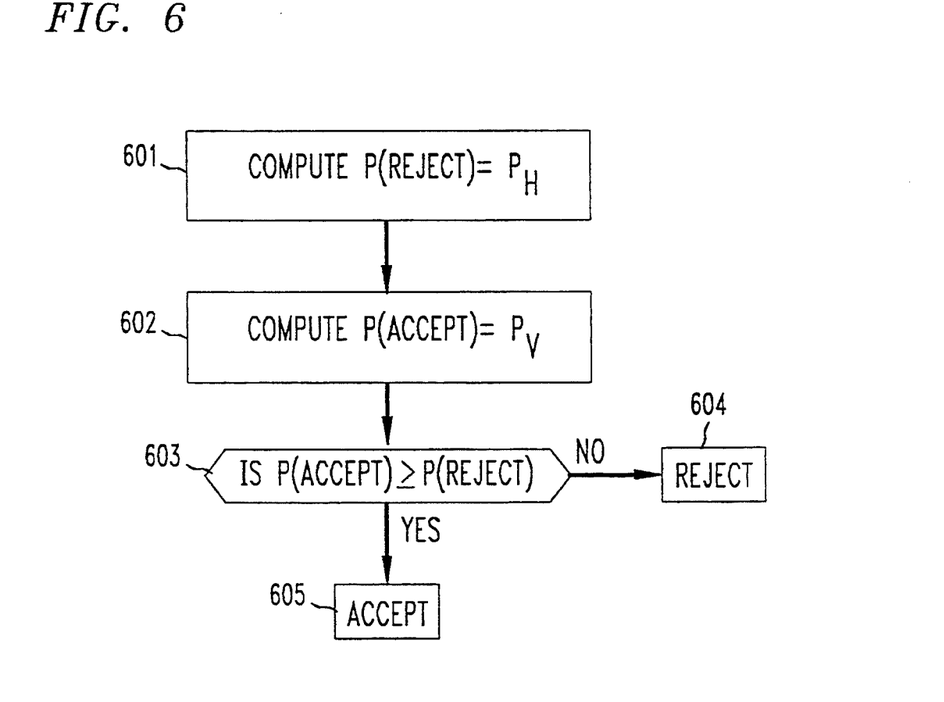
FIG. 6 illustrates the access decision process performed in access decision processor 140.

FIG. 6 illustrates the process followed in access decision processor 140, which uses the outputs of nearest cluster locator 130 to determine if access should be granted or denied. In step 601, the value of a "reject probability", denoted p(reject) is computed; in step 602, the value of an "accept probability", denoted p(accept) is computed. Each of these values is a function of the distances $d_h$ and $d_v$ output from nearest cluster locator 130 of FIG. 1 in step 510 of FIG. 5. The nature of the functions will be appreciated by now referring to FIGS. 7 and 8.

Figure 7:
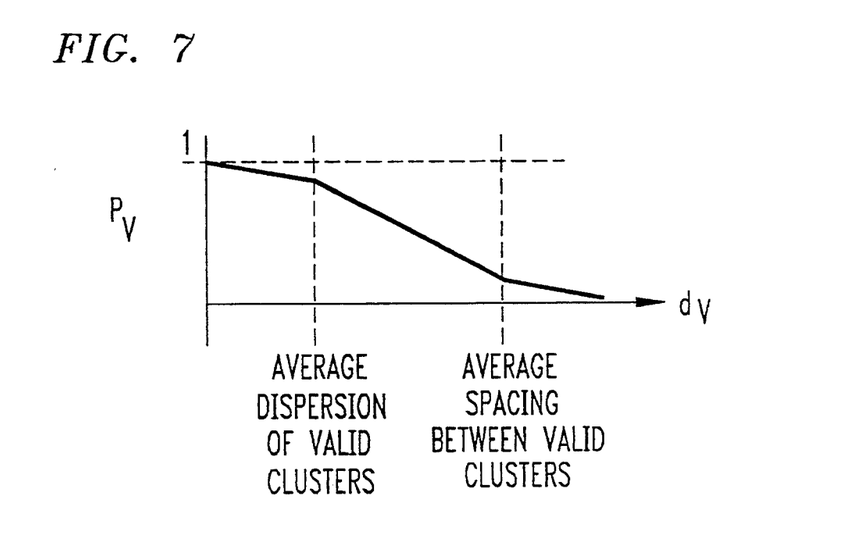
FIG. 7 is a graph illustrating the relationship between the probability of acceptance p(accept) and the distance ($d_v$) between the location in multidimensional space, of a given access attempt and the nearest cluster representing attributes of valid users.

FIG. 7 illustrates the relationship between the probability p(accept) that a particular access attempt is valid, which is a function of the distance $d_v$ between the location in a multidimensional space, of a given access attempt and the nearest cluster representing attributes of valid users. As shown, the probability curve has three distinct regions, labeled 701, 702 and 703. In region 701, the distance between the present sample and the nearest valid cluster is less than the average dispersion of valid clusters generally. By dispersion, what is meant is the average distance between points in a cluster and the centroid of a cluster. If $d_v$ is less than this average distance, then the sample point can be thought of a lying within an average cluster, and it is therefore highly likely that the present access request is legitimate. In this region, the probability of acceptance is consequently very high.

In region 702, the distance $d_v$ is larger than in region 701, but less than the average spacing between valid clusters. When this is true, there is a reasonable (as opposed to high) likelihood that the access attempt is valid, since the sample point is not so far away from a valid cluster as to indicate that the attempt is likely not valid. In this circumstance, the probability drops with increased slope as distance increases.

In region 703, the distance $d_v$ exceeds the average spacing between valid clusters. This suggests with a high probability that the sample point is not connected with a valid access attempt. Accordingly, the value of p(accept) is very low.

Figure 8:
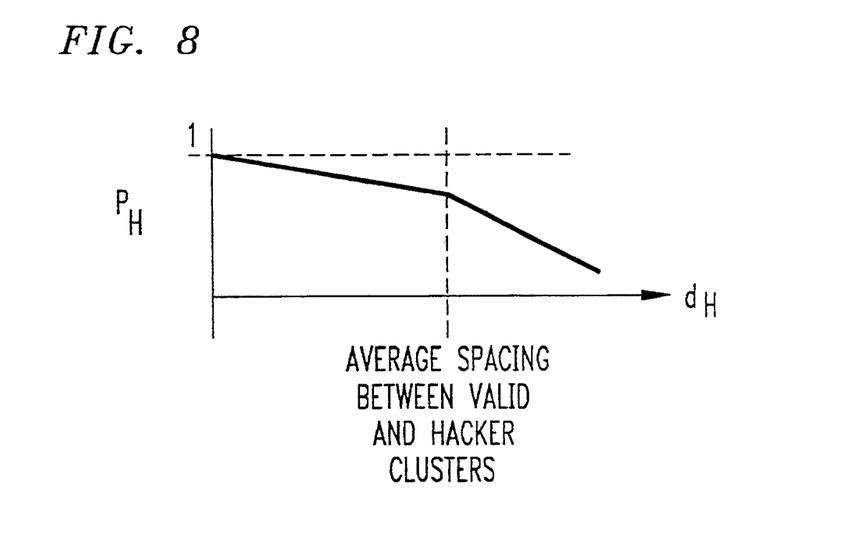
FIG. 8 is a graph similar to FIG. 7 illustrating the relationship between the probability of rejection p(reject) and the distance ($d_h$) between the location in multidimensional space, of a given access attempt and the nearest cluster representing attributes of hackers.

In a similar fashion to that just discussed, FIG. 8 illustrates the relationship between the probability p(reject) that a particular access attempt is not valid, which is a function of the distance $d_h$ between the location in a multidimensional space, of a given access attempt and the nearest cluster representing attributes of hackers. As shown in that figure, the probability curve has two regions, 801 and 802. In region 801, the distance $d_h$ is less than the average spacing between valid and hacker clusters. This means that the present sample point, which is nearest to a hacker cluster, is likely to be associated with that cluster than with a valid cluster. In this circumstance, the probability of rejection is very high. In region 802, on the other hand, the distance $d_h$ is larger than the average spacing between valid and hacker clusters. In this circumstance, the present sample point could well fall into either category, valid or hacker. Thus, the probability of rejection is lower, and decreases proportionately with increasing distance $d_h$.

It is to be noted that FIGS. 7 and 8 are not usually the same: different considerations determine the probability of hacker and valid user behavior. It is this difference that makes this aspect of the invention more effective in determining access decisions than using using only the minimum distance considering only $d_v$ and $d_h$. Of course, if there were an equal "cost penalty" for admitting a hacker or rejecting a valid user, the probability distributions of FIGS. 7 and 8 might be the same, and the simpler minimum distance decision criteria might be sufficient. However, as described above, these conflicting costs are generally not equivalent.

Returning to FIG. 6, it is seen that the probabilities of acceptance and rejection computed in steps 602 and 601, respectively, are compared in step 603. If p(accept) is greater, access is permitted, otherwise access is denied. It is to be noted that the probability analysis just described will sometimes produce erroneous results, and that other methods of access verification can be used in conjunction with this invention. Just as chance noise on a channel may sometimes cause a data signal to be incorrectly decoded, statistical variation in a user's behavior might occasionally inject signals that appear to be the behavior of a hacker. Lacking some strong authentication technique (e.g., voice password) that gave strong assurance (e.g., a small distance measure between the received speech and stored template), these access attempts would probably best be denied.

Figure 9:
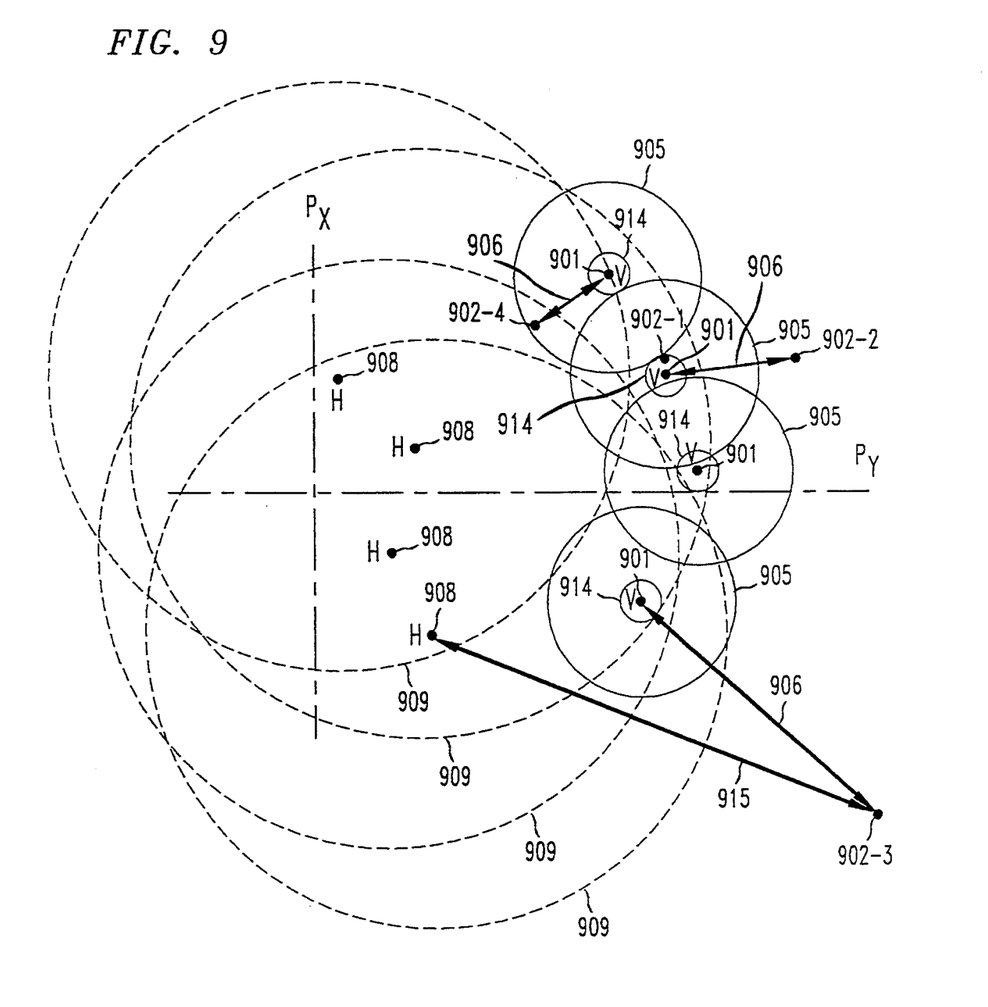
FIG. 9 is a diagram illustrating an example of the possible location, in a two-dimensional space, of several attribute clusters for both valid users and hackers, as well as the locations of several access request samples.

The variation in probability of acceptance of an access attempt represented by a point S in n dimensional space, as a function of the distance between S and existing clusters, may be better understood in light of the diagrams of FIG. 9. In FIG. 9, for the purpose of simplicity, a two dimensional representation of the n- dimensional attribute space is shown. Here, parameters $p_x$ and $p_y$ are shown with clusters corresponding to "valid" user behaviors 901. An access attempt indicated by sample point 902-2 is shown along with average cluster spacing measures 905. If the least of the distance measures 906 between any of valid user behaviors 901 and access attempt 902 is large as compared with the average inter-cluster spacing 905, then, in accordance with FIG. 7, a LOW probability of acceptance would be appropriate. Thus, despite the fact that the new access attempt 902-2 is closer to the valid user behaviors 901 than it might be to a hacker behavior, it is still farther from the valid user behavior than historical data has shown typical valid user behavior to be. On the other hand, if the new access attempt 902-1 is closer to one of the valid user behaviors 901 than the average dispersion of a cluster 914, then, in accordance with FIG. 7, a HIGH probability of acceptance would be appropriate. For intermediate distances between the new access attempt and the valid behaviors, compared to the inter-cluster spacing and average cluster dispersion, intermediate values for the probability of acceptance would be indicated, as shown in FIG. 7. Specifically, HIGH values of probability of access might correspond to values above 95%. LOW values might correspond to values below 10%.

FIG. 9 also illustrates how values for probability of acceptance would be determined when a new access attempt is compared to hacker behaviors. Here, a first access attempt 902-3 is compared to valid clusters 901 and to hacker clusters 908. Although the nearest cluster would be one of valid clusters 901, and while the distance 906 to this valid cluster is not overly large compared to the spacing between valid clusters 905, the distance 915 to a hacker cluster is greater than the average spacing between hacker and valid clusters 901. For this reason, the probability of rejecting this new access attempt would be HIGH. On the other hand, for a second new access attempt 902-4, the distance to the nearest hacker cluster 908 is comparable to the distance to a valid cluster 901. In spite of this, the distance to the hacker cluster is large compared to the average distance between hacker and valid clusters 909, the probability of rejecting this access attempt is LOW, as shown in FIG. 8.

The preceding discussion made no direct reference to the fact that a decision with respect to a particular access request can use historical information relating to previous access requests from the same user. Thus, rather than the storage-intensive needs of traditional access control techniques, which store a profile for each user that may request access, this invention can easily be arranged so as to principally rely on generic information for processing cluster descriptions and for calculating the nearest cluster and valid user/hacker probabilities for each specific access request. However, if additional storage and processing resources are available, the invention can be adapted to make access decisions using a modest amount of per user information, essentially identifying what behavior class a specific user belongs to. This may be accomplished by using an additional database to store, in conjunction with information identifying each particular user, the results of the analysis, in terms of the nearest cluster index and type, for previous access attempts by that user. Then, when the same user again requests access, the stored cluster index and type may be compared with the information generated during the present access attempt. This use of historical information can be thought of as assembling, on an individual user basis, a valid user signalling alphabet defined as the clusters known to be valid for that user, and a hacker signalling alphabet, including clusters known to be invalid for that user. Any significant deviation from normal behavior could then be detected; if calls originated by a person or persons claiming to be a particular user generated behavior that looked highly unusual as compared to that user's historical profile, it would be a safe assumption that this user's identity had been compromised.

Various modifications can be made to this invention without departing from the basic principles outlined above. For example, notwithstanding the desire to avoid the need to store records in access attempt database in accordance with user specific data and to exclude user specific information from the cluster descriptions stored in database 120, it may be advantageous in some embodiments to arrange access attempt database 101 to store and retrieve records in response to the alleged identity of the party requesting access, and/or by arranging cluster description processor 110 to retrieve records directed to that party, or to parties of a similar class or type. Alternatively, arrangements can be devised in which most of the data is user-specific, but some data is nevertheless based on the gross attributes of the general population of access requesters.

I claim:

1. A system for controlling access by a user to a resource based upon attributes of said user, comprising
   means (101) for storing data representing attributes of persons eligible for access and persons ineligible for access;
   signal processing means (110) for processing signals representing data stored in said storing means to form a plurality of attribute profiles, each of said attribute profiles being indicative of attributes of either eligible or ineligible users;
   signal correlating means (130) for determining resemblance of said attributes of said user requesting access to (1) a first one of said attribute profiles of an eligible user most similar to said attributes of said user requesting access, and (2) a second one of said attribute profiles of an ineligible user most similar to said attributes of said user requesting access, and
   means (140) for generating an access control signal allowing access to the resource based upon a relative resemblance between said attributes of said user requesting access and said first and second attribute profiles.

2. An access control system for determining if a particular access request is most likely valid or most likely fraudulent, said system including
   means for storing data obtained from transactions involving both valid and fraudulent users
   signal processing means for forming clusters by clustering data in said storing means in a multidimensional attribute space, each of said clusters representing an attribute profile of similar user behaviors,
   signal correlation means for evaluating similarity between attributes of said particular access request and each said attribute profile represented by each of said clusters, to identify profiles of valid and fraudulent users that most closely resemble attributes of said particular access request, and
   means for generating an access control signal based upon which type of user, valid or fraudulent, said particular access request most closely resembles.

3. The invention defined in claim 2 wherein said access decision making means further includes
   means for comparing probabilities of eligibility for access, based upon relative closeness of resemblances between each said attribute profile of valid and fraudulent users and said attributes of said particular access request, and a function which relates said probabilities of eligibility to other factors.

4. The invention defined in claim 3 wherein said other factors include confidence in said access decision and value of a resource to which said access request is directed.

5. The invention defined in claim 4 further including means for storing a history of previous access requests by particular users for subsequent use in said access control system.

6. A system for granting access to a resource to an authorized user, comprising
   means for storing data obtained from transactions involving both authorized users and hackers, said user data being stored in the form of multiple records, each containing a plurality of numerical attribute values,
   signal processing means for analyzing said data stored in said storing means to define clusters in a multidimensional attribute space using an iterative minimum distance modelling technique, each of said clusters being represented by its coordinates in said multidimensional attribute space,
   signal correlation means for evaluating similarity between attributes of an access request and attribute profiles represented by said clusters by identifying at least one of said clusters having a smallest distance to a point in a multidimensional attribute space that represents attributes of said access request, and
   means for generating an access control signal based upon a distance between said at least one closest cluster and said point in said multidimensional attribute space that represents said access request.

7. The invention defined in claim 6 wherein said analyzing means is arranged to define a first set of clusters for authorized users and a second set of clusters for hackers, and wherein said evaluating means is arranged to identify first and second clusters for authorized users and for hackers that are closest to said point.

8. The invention defined in claim 7 wherein said access control signal generating means includes means for computing a probability of eligibility for access as a function of relative distances to nearest clusters for authorized users and for hackers, dispersion of the clusters, average spacing between clusters for authorized users, and average distance between authorized user and hacker clusters.

9. Apparatus for determining eligibility of a particular user to access a resource based upon attributes of access being requested, comprising
   means for collecting data representing attributes of persons eligible for said access and persons ineligible for said access;

means for processing said collected data to form a plurality of attribute profiles, each of said profiles being indicative of attributes of either eligible or ineligible users;

means for determining resemblance of attributes of said particular user to (1) a first one of said attribute profiles, said first profile being a most similar one of said profiles which is indicative of attributes of an eligible person, and (2) a second one of said attribute profiles, said second profile being a most similar one of said profiles which is indicative of attributes of an ineligible person, means for generating a first signal indicative of a probability of eligibility based upon a degree of resemblance between said attributes of said particular user and said first profile, means for generating a second signal indicative of a probability of ineligibility based upon a degree of resemblance between said attributes of said particular user and said second profile, and means for allowing access to the resource by said particular user if the magnitude of said first signal is greater than the magnitude of said second signal.

10. A method of controlling access by a user to a resource based upon attributes of said user, comprising the steps of storing in a database data representing attributes of persons eligible for access and persons ineligible for access;

processing signals representing said data stored in said storing step to form a plurality of attribute profiles, each of said attribute profiles being indicative of attributes of either eligible or ineligible users;

correlating said attribute profiles with the attributes of said user requesting access to determine resemblance of said attributes of said user requesting access to (1) a first one of said attribute profiles of an eligible user most similar to said attributes of said user requesting access, and (2) a second one of said attribute profiles of an eligible user most similar to said attributes of said user requesting access, and generating a control signal allowing or denying access to said resource based upon a relative resemblance between said attributes of said user requesting access and said first and second attribute profiles.

11. An access control method used for determining if a particular access request is most likely valid or most likely fraudulent, said method including the steps of storing data obtained from transactions involving both valid and fraudulent users, forming clusters by clustering data in said storing means in a multidimensional attribute space, each of said clusters representing an attribute profile of similar user behaviors, correlating signals representing said clusters with signals representing a particular access request to evaluate similarity between attributes of said particular access request and each said attribute profile represented by each of said clusters, to identify profiles of valid and fraudulent users that most closely resemble attributes of said particular access request, and generating an access control signal based upon which type of user, valid or fraudulent, said particular access request most closely resembles.

12. The method defined in claim 11 wherein said access decision making method further includes the step of comparing probabilities of eligibility for access, based upon relative closeness of resemblances between each said attribute profile of valid and fraudulent users and said attributes of said particular access request, and a function which relates said probabilities of eligibility to other factors.

13. The method defined in claim 12 wherein said other factors include confidence in said access decision and value of resource to which said access request is directed.

14. The method defined in claim 13 further including the step of storing a history of previous access requests by particular users for subsequent use in said access control method.

15. A method for granting access to a resource to an authorized user, comprising the steps of storing data representing signals generated as a result of transactions involving both authorized users and hackers, said user data being stored in the form of multiple records, each containing a plurality of numerical values which are attributes of said signals, analyzing said signals by processing said stored data to define clusters in a multidimensional attribute space using an iterative minimum distance modelling technique, each of said clusters being a signal represented by its coordinates in said multidimensional attribute space, evaluating similarity between attributes of said access request and attribute profiles represented by said clusters by identifying at least one of said signals representing clusters having a smallest distance to a point in a multidimensional attribute space that represents attributes of said access request, and generating an access control signal based upon a distance between said at least one closest cluster and said point in said multidimensional attribute space that represents said access request.

16. The invention defined in claim 15 wherein said analyzing step includes defining a first set of clusters for authorized users and a second set of clusters for hackers, and performing said evaluating step by identifying first and second clusters for authorized users and for hackers that are closest to said point.

17. The invention defined in claim 16 wherein said access decision making step includes computing a probability of eligibility for access as a function of relative distances to nearest clusters for authorized users and for hackers, dispersion of the clusters, average spacing between clusters for authorized users, and average distance between authorized user and hacker clusters.

18. A method of determining eligibility of a particular user to access a resource based upon attributes of access being requested, comprising the steps of collecting data representing attributes of persons eligible for said access and persons ineligible for said access;

processing said collected data to form a plurality of attribute profiles, each of said profiles being indicative of attributes of either eligible or ineligible persons;

determining resemblance of attributes of said particular user to (1) a first one of said attribute profiles, said first profile being a most similar one of said profiles which is indicative of attributes of an eligible person, and (2) a second one of said attribute profiles, said second profile being a most similar one of said profiles which is indicative of attributes of an ineligible person, generating a first signal indicative of a probability of eligibility based upon a degree of resemblance between said attributes of said particular user and said first profile, generating a second signal indicative of a probability of ineligibility based upon a degree of resemblance between said attributes of said particular user and said second profile, and allowing access to the resource by said particular user if the magnitude of said first signal is greater than the magnitude of said second signal.

* * * * *